United States Patent Office 2,818,457
Patented Dec. 31, 1957

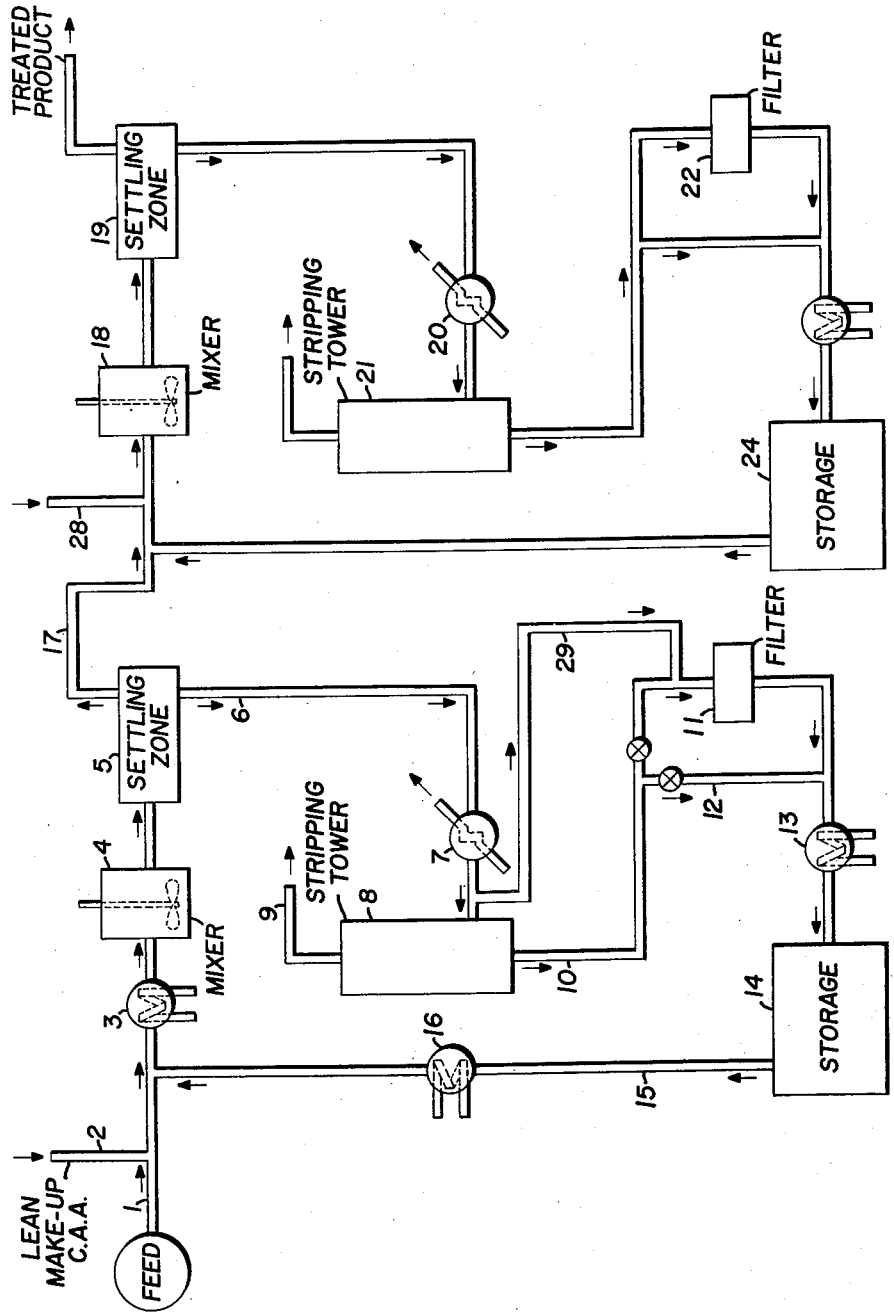

2,818,457

ACETYLENE REMOVAL FROM HYDROCARBON STREAMS

Robert Wayne MacDonald, Baton Rouge, La., assignor to Esso Research and Engineering Company, a corporation of Delaware Application June 26, 1956, Serial No. 593,899

8 Claims. (Cl. 260—681.5)

This invention relates to an improved prewash system for removing selectively acetylenes from a butadiene bearing stream contaminated therewith prior to the extraction of the butadiene in an extraction plant. More particularly, this invention relates to the selective removal of vinyl, methyl and ethyl acetylenes from a butadiene bearing stream by treating the butadiene bearing stream containing these acetylenes with certain copper ammonium acetate solutions in at least two stages.

It is known that butadiene bearing streams from such sources as non-catalytic thermal cracking tend to contain substantial amounts of acetylene, which cause difficulties when the butadiene is subsequently extracted and purified. It has been suggested to contact the acetylene containing butadiene bearing hydrocarbon stream with relatively small amounts of cuprous ammonium acetate solution to selectively extract all of the acetylenes from this hydrocarbon stream without extracting substantial amounts of butadiene. Minor amounts of butadiene which are extracted by the above process are desorbed by the application of heat and the acetylene containing cuprous ammonium acetate solution may be stripped to produce acetylene and a regenerated lean cuprous ammonium acetate solution. While this technique was an advance over the prior art there are several undesirable drawbacks to such a procedure. For example, it is known that acetylenes polymerize upon standing, especially when heat is applied. The conditions generally required when acetylenes are stripped from a fat cuprous ammonium acetate solution would tend to result in polymer formation. Also in such a procedure acetylenes will polymerize during the butadiene desorption stage. This polymer must then be substantially removed from the cuprous ammonium acetate solution in order to reuse it in an initial extraction zone. Substantial amounts of polymer in the system will cause foaming and make the process inoperative.

One such method of removing acetylene polymer is to pass the polymer containing copper solution through a char filter. When a single stage system is employed this procedure has been found to result in undesirably high operating cost since acetylene polymer rapidly builds up to such an extent that very frequent replacement of the filter is required. Moreover, some of the lower molecular weight polymers are difficult to filter out of solution.

It is therefore a primary object of this invention to provide a process of selectively removing acetylenes, i. e. vinyl, methyl and ethyl acetylenes from a butadiene bearing stream wherein acetylene polymer formation if desired may be kept down to an absolute minimum. By substantially reducing or eliminating polymerization it is possible to omit the filtration step.

It is further an object of this invention to provide a process wherein substantially all of the vinyl-acetylene may be removed in a practical manner as a polymer, thus eliminating a vinyl acetylene stripping stage.

An overall object of this invention is to provide a prewash system of the type mentioned above wherein the necessary stages employed are extremely flexible and can be changed by simple modifications without interferring with the quantitative removal of acetylenes from the hydrocarbon stream.

Butadiene bearing streams of the type which may be employed in the present process will contain varied amounts of different hydrocarbons including some saturated, monoolefinic and diolefinic hydrocarbons and minor amounts of vinyl, methyl and ethyl acetylene. The following table discloses both a specific and general type feed which is applicable to the present process.

TABLE I

| Feed—HC | Weight percent | |
|---|---|---|
| | Specific | Range |
| $C_3$ (all) | 1.0 | 0 to 90 |
| $C_4$ saturated | 1.0 | 0 to 90 |
| $C_4$ monoolefinic | 70.0 | 0 to 90 |
| $C_4$ diolefinic | 27.0 | 10 to 100 |
| $C_{5+}$ (all) | .82 | 0 to 90 |
| Vinyl acetylene | .06 | .001 to 2.0 |
| Methyl acetylene | .06 | .001 to 2.0 |
| Ethyl acetylene | .06 | .001 to 2.0 |

It has been found that aqueous cuprous ammonium acetate will extract vinyl acetylenes about 6–7 times more easily than methyl acetylene and about 18–19 times more easily than ethyl acetylene. This may be evidenced by the following example wherein the figure on the right "K"=p. p. m. acetylene in hydrocarbon after treatment p. p. m. acetylene in C. A. A. solution (cuprous ammonium acetate) and represents the ease of extracting respectively vinyl, methyl and ethyl acetylenes. It is to be understood that the extraction in the following example is much more complete than contemplated for the first stage of this process.

Example

For this experiment a hydrocarbon stream of the following composition was contacted with 0.31 part by weight of C. A. A. solution at 35° F. in an orifice mixer with 15 p. s. i. pressure drop and the treated solution was allowed to settle.

| Hydrocarbon | Wt. percent | C. A. A. solution | Moles/liter |
|---|---|---|---|
| Total $C_3$ | 0.41 | $Cu^{++}$ | 0.19 |
| Butadiene | 28.77 | $Cu^+$ | 3.12 |
| Butylenes | 68.65 | $Ac^-$ | 4.65 |
| Butanes | 1.99 | $NH_3$ | 10.16 |
| Heavier | 0.00 | | |
| Acetylenes | 0.18 | | |

Samples of feed and product hydrocarbon were contacted with alcoholic silver nitrate (0.1 N solution) at 70° F. Precipitated acetylenes were then regenerated by adding about 30% hydrochloric acid solution and the resulting gas from each sample analyzed by mass spectrometer. The following contents of acetylenes in each stream were calculated from the mass spectrometer analyses.

| Acetylene | "P. p. m." in feed | "P. p. m." in hydrocarbon after treatment | "P. p. m." in solution | K |
|---|---|---|---|---|
| Total | 1,800 | 300 | 1,500 | .200 |
| Methyl | 642 | 93 | 549 | .169 |
| Vinyl | 555 | 14 | 541 | .025 |
| Ethyl | 603 | 193 | 410 | .470 |

In accordance with one embodiment of this invention the hydrocarbon feed is first treated with a relatively dilute copper ammonium acetate solution which will be defined hereinafter to selectively remove at least major amounts and preferably about 80% of the vinyl acetylenes and no more than minor amounts, e. g. 35%, of methyl and ethyl acetylenes. The dilute cuprous ammonium acetate solution containing vinyl acetylene as acetylide can then be stripped at a relatively rapid rate.

It has been found that the rapidity and completeness of stripping can be controlled by the proper concentration of cuprous ion in the C. A. A. solution. To illustrate the effects of varying cuprous ion concentrations several tests were made. Several C. A. A. solutions containing acetylenes in the form of acetylides were stripped with the conditions and results shown in the following table:

TABLE II

| C. A. A. solution analysis, moles/liter | | | | Acetylides in C. A. A. solution | | Bottoms temp. of stripper, °F. | Percent acetylene regeneration |
|---|---|---|---|---|---|---|---|
| $Cu^{++}$ | $Cu^{+}$ | $NH_3$ | $Ac^-$ | Before stripping | After stripping | | |
| 0.09 | 3.01 | 10.85 | 6.29 | 0.046 | 0.020 | 194 | 57 |
| 0.18 | 2.93 | 10.84 | 5.95 | 0.079 | 0.025 | 194 | 68 |
| 0.14 | 2.77 | 9.97 | ---- | 0.028 | 0.006 | 194 | 78 |
| 0.21 | 2.14 | 8.73 | 5.02 | 0.063 | 0.009 | 200 | 86 |
| 0.40 | 1.54 | 8.95 | 5.00 | 0.037 | Nil | 190 | 100 |
| 0.38 | 1.44 | 8.24 | 4.64 | 0.024 | Nil | 193 | 100 |
| 0.29 | 1.57 | 8.24 | 4.72 | 0.020 | Nil | 197 | 100 |

These results show that a more complete stripping can be accomplished at the same conditions when the cuprous ion is kept below 2.5 moles per liter and preferably below about 2.0 moles per liter. In the present process by virtue of the substantially complete rapid stripping of vinyl acetylenes in the first stage, polymerization is reduced to a minimum.

It is to be understood that the acetylene polymerization is dependent to a great extent upon the period of time which the acetylene is maintained at elevated or even room temperatures. Having thus stripped the vinyl acetylene, which will be present principally at acetylides, from the copper solution this solution may then be recycled to the primary absorption stage. In the event that trace amounts of polymer are formed the stripped solution may be passed through an activated charcoal filter prior to recycle. Other filter media such as silica gel, kieselguhr, alumina, "molecular sieves," and the like, may be used instead of char. If desired the polymer may be removed by any well known solvent extraction technique. The butadiene bearing stream from which has been stripped at least a major portion of the vinyl acetylenes may then be passed to at least one additional extraction stage wherein the same or stronger concentration of copper solution is employed to remove most of the remaining acetylenes. The term "stronger concentration of copper solution" is employed herein to mean higher concentrations of the cuprous ion. In this second stage, polymerization again is reduced to a minimum since the methyl and ethyl acetylenes polymerize to a much lesser extent than the vinyl acetylenes. Polymerization of methyl and ethyl acetylenes is particularly inhibited by absence of vinyl acetylene. Moreover the methyl and ethyl acetylenes which are more difficultly absorbed by the copper solution than the vinyl acetylenes, can be stripped more easily, thus requiring less stripping time and milder conditions, the overall result being less polymer formation. It therefore becomes readily apparent that this two or more stage process involving the selective removal of vinyl acetylenes prior to the removal of methyl and ethyl acetylenes is an improved process whereby difficulties encountered due to polymerization are eliminated or at least reduced, and stripping which otherwise must be carefully controlled, in the present process may be operated under a number of different conditions.

To aid in the description of this invention reference will now be had to the drawing wherein the sole figure represents a flow plan of a method of removing acetylenes from the hydrocarbon stream while forming a minimum amount of polymer.

Referring now to the figure, a feed such as described in Table I is passed via line 1, mixed with a cuprous ammonium acetate solution from line 2 and passed through a chilling zone 3 wherein the mixture of hydrocarbon feed and aqueous solution of cuprous ammonium acetate is cooled to a temperature of 10° to 60° F., preferably about 30° to 50° F. In this initial stage wherein vinyl acetylenes are selectively removed, the cuprous ammonium acetate solution must contain certain critical concentrations of the various ions. The table below indicates a specific illustrative composition and ranges of the various ions which may be employed.

TABLE III

| Composition | Moles/liter | |
|---|---|---|
| | Preferred | Range |
| $Cu^{++}$ | 0.2 | 0.05 to 0.7 |
| $Cu^{+}$ | 1.0 | 0.5 to 2.5 |
| $NH_3$ | 9.5 | 5 to 12 |
| Acetate | 5.0 | 2 to 7 |

It is also necessary in this first stage extraction to restrict the weight ratio of aqueous C. A. A. to hydrocarbon feed to about 0.05 to 1.0 and preferably 0.5 to 0.6. If higher ratios are employed undesirable extraction of butadiene and excessive extraction of methyl and ethyl acetylenes may occur in this first stage.

The hydrocarbon feed and aqueous copper solution are then mixed in any conventional type mixer such as at 4 and passed to a settling zone 5 wherein the hydrocarbon phase is permitted to separate from the fat aqueous ammonium acetate solution containing at least about 50% of the vinyl acetylenes and minor amounts of methyl and ethyl acetylenes and substantially no butadiene. If desired an orifice type mixer or other conventional means may be employed for mixing the C. A. A. solution and hydrocarbon feed. The bottom aqueous layer is then passed via line 6 to stripping tower 8 wherein substantially all of the acetylenes which comprise mostly vinyl acetylene are removed with a minimum of polymerization via line 9. It will be noted that stripping conditions within stripper 8 may vary considerably. The fat solution may first be preheated in heater 7 and stripping temperatures may run between 150° to 225° F., preferably 190° to 200° F. Pressure may be as high as 50 p. s. i. g. but preferably as low as possible. While it is possible to strip the acetylenes at close to atmospheric pressures and at low temperatures in the presence of an inert gas which would to a certain degree inhibit polymerization these conditions are not required in the present process since as previously noted the vinyl acetylene is stripped at a rapid rate, not allowing time for any substantial polymerization to occur. From stripper 8 the vinyl acetylene may be recovered via line 9 and the remaining lean cuprous solution taken as bottoms via line 10. In many instances a filtration step will not be needed; however, any very minor amounts of polymer formed up to this point may be removed by passing the lean solvent through a char filter 11. The solution passed through the char filter is preferably maintained at temperatures between 100° to 225° F. with from 2 to 7 hours residence time to permit removal of traces of polymer. Since the amount of polymer formed via this process is negligible the life of the char filter is exceedingly long. If insufficient polymer is present in the lean solvent the solution may be passed directly to storage tank 14 via line 12 and cooler 13, thus bypassing the filter. Lean C. A. A. may then be recycled via lines 15 optionally through cooler 16 and mixed with fresh hydrocarbon stream at 4 to complete the cycle. The hydrocarbon butadiene bearing stream which is recovered at settler 5 via line 17 and which contains at most very minor amounts of vinyl acetylene and substantial amounts of methyl and ethyl acetylene is then passed through a second stage similar to the first employing a C. A. A. make-up line 28, mixer 18, settler 19, heater 20, stripper 21, char filter 22, cooler and storage drum 24. The settling zones 5 and 19 may have automatic level control devices contained therein to regulate the rates at which the top phase hydrocarbon liquid and lower phase C. A. A. solution are withdrawn. Temperatures within the stripper 21 are about the same as those employed in stripper 8 of the first stage. The second stage aqueous cuprous ammonium acetate solution may be the same as employed in the first stage but preferably it is a more concentrated solution to insure a substantial removal of the remaining methyl and ethyl acetylenes and any very minor amounts of vinyl acetylenes which were not removed in the first stage. Accordingly, an aqueous cuprous ammonium acetate solution having a composition such as described in the following table is preferred; however, the cuprous ion concentration may run as low as 2.0 moles per liter.

TABLE IV

| Composition | Moles/liter | |
|---|---|---|
| | Preferred | Range |
| $Cu^{++}$ | 0.2 | 0.05 to 0.7 |
| $Cu^+$ | 3.0 | 2.5 to 4 |
| $NH_3$ | 9.8 | 5 to 12 |
| Acetate | 5.0 | 2 to 7 |

In essence therefore the procedure of stage 1 is repeated in stage 2 and any subsequent stages, the major varying factor being the type of solution employed and ratio of HC/C. A. A. In stage 2 the ratio of aqueous cuprous ammonium acetate solution to hydrocarbon is maintained at a minimum, e. g. 0.2 to 0.5, in order to prevent extraction of large amounts of butadiene. Although substantially complete acetylene removal may be accomplished in the second stage by the use of a more concentrated C. A. A. solution and higher ratios of C. A. A. to hydrocarbon, this practice would not be particularly desirable since much of the butadiene would unavoidably be extracted. In a preferred embodiment conditions of the second stage extraction are maintained to remove about 80–90% of the total acetylenes from the partially treated hydrocarbon stream while keeping butadiene extraction down to a minimum. It is to be understood, although for the sake of brevity it will not be discussed in detail, that any minor amounts of butadiene absorbed in stage 2 or any subsequent stage can be removed by selectively desorbing the butadiene under controlled conditions of temperature and pressure prior to stripping the acetylenes from the hot cuprous ammonium acetate solution.

In another modification of this invention, essentially the same feed stream and aqueous cuprous ammonium acetate solution as in stage 1 is employed. However, in this modification the stripping step 8 which as previously shown follows the settling and heating zones 5 and 7 is omitted and instead the entire fat copper solution is passed to filter zone 11 via line 29 bypassing the stripping step to permit removal of substantially all of the vinyl acetylenes in the form of polymer. This would not be practical in a one stage process since the time required to polymerize methyl and ethyl acetylenes would be so great as to result in an impractical operation whereas the vinyl acetylenes polymerize easily at temperatures of about 150° to 225° F. and at pressures of atmospheric to about 70 p. s. i. g. A residence time of 2 to 20 hours at these conditions in the filter zone permits substantially complete polymerization. The lower range of operating temperatures requires the longer polymerization times indicated. If desired the acetylenes may be polymerized in a separate zone and then passed through the filter for separation. Moreover the vinyl acetylenes polymerize more completely so that there is remaining in the solution only negligible amounts of low molecular weight polymer to pass through the filter and build up in the system. While in this modification the stripping step is eliminated it is to be understood that the build-up of polymer on the char will be somewhat substantial and more frequent filter changes will be required. Therefore it is desirable to change the filter sufficiently often in order to maintain the solution polymer content, which may be measured by amyl alcohol extraction, at below about 0.1 wt. percent. Polymer content in the system above this amount will cause excessive foaming and make the process inoperative.

*Example*

A hydrocarbon stream having the specific composition shown in Table I is continuously admixed with the preferred C. A. A. solution shown in Table II at a rate of 1 part by weight hydrocarbon to 0.5 part of C. A. A. at a temperature of about 40° F. and a pressure of 70 p. s. i. g. and passed to a first stage settler wherein phase separation occurs. The top hydrocarbon phase contains about 0.01 wt. percent vinyl acetylene, 0.03 methyl acetylene, and 0.05 ethyl acetylene. The fat C. A. A. solution containing 0.10 wt. percent vinyl acetylene in the form of acetylide based on hydrocarbon and minor amounts of methyl and ethyl acetylenes is then passed to a stripping tower wherein temperatures are held at about 195° F. at atmospheric conditions for a period of 10 minutes. The stripped lean C. A. A. solution which contains less than 0.005 mole per liter of acetylides is then passed to a filter tank containing activated charcoal and maintained therein at 190°–200° F. for a period of 5 hours whereby traces of acetylene are polymerized and removed. The lean solution from the filter zone is then recycled to the initial extraction zone. The hydrocarbon stream from the first stage settling zone is then admixed with fresh C. A. A. solution as shown in Table IV (preferred) at a rate of about .4 part of C. A. A. to 1 part by weight of hydrocarbon solution and passed to a second stage settling zone. The treated hydrocarbon product from the second stage settler contained substantially no vinyl acetylene and only trace amounts of methyl and ethyl acetylene. The C. A. A. solution in the second stage is regenerated in a manner similar to the first stage regeneration for recycle.

What is claimed is:

1. A process of removing methyl, ethyl and vinyl acetylenes from a butadiene bearing stream containing them in minor amounts which comprises contacting said butadiene bearing stream with a dilute aqueous solution of cuprous ammonium acetate in an amount to selectively absorb at least a major amount of the vinyl acetylene and no more than minor amounts each of the methyl and ethyl acetylenes, separating a fat dilute cuprous ammonium acetate solution containing said vinyl acetylene, contacting the remaining butadiene bearing stream with a second cuprous ammonium acetate solution in an amount to extract substantially all of the remaining vinyl acetylene and at least a major amount of methyl and ethyl acetylenes and separating a butadiene bearing solution having a substantially reduced acetylene content.

2. A process in accordance with claim 1 wherein at least 80% of the vinyl acetylene present in the butadiene bearing stream is absorbed by the dilute aqueous solution of cuprous ammonium acetate.

3. A process of removing acetylenes from a butadiene bearing stream contaminated therewith, said acetylenes comprising methyl, ethyl and vinyl acetylenes, which comprises extracting selectively vinyl acetylenes from said stream with a dilute cuprous ammonium acetate solution containing no more than 2.5 moles per liter of cuprous ion, contacting the resultant butadiene bearing stream having a reduced vinyl acetylene content with a second cuprous ammonium acetate solution containing from 2 to 4 moles per liter of cuprous ion, extracting a major portion of the remaining acetylenes from said stream and recovering a butadiene bearing stream having a substantially reduced acetylene content.

4. A method in accordance with claim 3 wherein at least 80% of the vinyl acetylene present in the initial butadiene bearing stream is extracted by said dilute cuprous ammonium acetate solution.

5. A two-stage cyclic process of prewashing a butadiene bearing stream to remove acetylenes therefrom which comprises in a first stage contacting said butadiene bearing stream with a dilute aqueous solution of cuprous ammonium acetate to absorb at least a major portion of the vinyl acetylene and no more than a minor portion each of the methyl and ethyl acetylenes, separating a butadiene bearing stream having a reduced vinyl acetylene content and a fat cuprous ammonium acetate solution, heating said fat cuprous ammonium acetate solution to strip vinyl acetylene therefrom without substantial polymerization to produce a lean dilute cuprous ammonium acetate solution, recycling said lean ammonium acetate solution to the first stage and employing said solution as the initial absorbent, contacting the butadiene bearing stream having a reduced vinyl acetylene content in a second stage with a fresh cuprous ammonium acetate solution to remove a major portion of the remaining acetylenes, separating a fat cuprous ammonium acetate solution and heating said solution to strip therefrom major amounts of methyl and ethyl acetylenes and at most minor amounts of vinyl acetylene without substantial polymer formation to recover a lean cuprous ammonium acetate solution suitable for recycling to a second stage contacting zone and a butadiene bearing stream having a substantially reduced acetylene content.

6. A method in accordance with claim 5 wherein the cuprous ammonium acetate solution in a first stage contains from 0.5 to 2.5 moles per liter of cuprous ion and a second stage cuprous ammonium acetate solution containing from 2 to 4 moles per liter of cuprous ion.

7. A two-stage cyclic process of prewashing a butadiene bearing stream to remove acetylenes therefrom which comprises contacting in a first stage said butadiene bearing stream with a dilute cuprous ammonium acetate solution to absorb at least a major portion of vinyl acetylene and no more than minor amounts of methyl and ethyl acetylene, separating a butadiene bearing stream having a reduced vinyl acetylene content and a fat cuprous ammonium acetate solution, polymerizing substantially all of the acetylenes in said fat solution, filtering said solution to remove said polymers and recycling lean cuprous ammonium acetate solution to said first stage, contacting said butadiene bearing stream having a reduced vinyl acetylene content in a second stage with a fresh cuprous ammonium acetate solution to absorb a major portion of the remaning acetylenes, separating a fat cuprous ammonium acetate solution, stripping acetylenes therefrom and recycling the lean solution to said second stage contacting and recovering a butadiene bearing stream having a substantially reduced acetylene content.

8. A method in accordance with claim 7 wherein said first stage cuprous ammonium acetate solution contains no more than 2.5 moles per liter of cuprous ion and said second stage cuprous ammonium acetate solution contains from 2 to 4 moles per liter of cuprous ion.

References Cited in the file of this patent
UNITED STATES PATENTS 2,472,487     Lovell _____ June 7, 1949